United States Patent [19]

Kurihara

[11] Patent Number: 4,562,464
[45] Date of Patent: Dec. 31, 1985

[54] X-RAY DIAGNOSTIC APPARATUS
[75] Inventor: Tetsuro Kurihara, Ootawara, Japan
[73] Assignee: Tokyo Shibaura Denki Kabushiki Kaisha, Kawasaki, Japan
[21] Appl. No.: 452,405
[22] Filed: Dec. 22, 1982
[30] Foreign Application Priority Data Jan. 8, 1982 [JP] Japan ................................ 57-1401

[51] Int. Cl.⁴ ............................................. H04N 5/32
[52] U.S. Cl. .................................... 358/111; 358/185; 378/99
[58] Field of Search ..................... 358/111, 182, 185; 378/99, 108, 63

[56] References Cited

U.S. PATENT DOCUMENTS 4,246,607  1/1981  Vijverberg ..................... 358/111
4,359,759  11/1982  McBride et al. ................ 358/111

FOREIGN PATENT DOCUMENTS 0158984  12/1979  Japan ........................... 378/63

OTHER PUBLICATIONS

H. Tanaka et al., "A Scoliosis Mass-Screening X-Ray Apparatus Using a Channel Image Amplifier", Official Journal of Japan Radiological Society, A Special Number, 39th Japan Radiological Society, An Abstract of a Scientific Publication, p. 101, No. 644, Apr. 10, 1980.
T. Kurihara, "An X-Ray Apparatus for Scoliosis Mass Screening of School Children", Toshiba Review, vol. 35, No. 10, pp. 874–877, 1980.

Primary Examiner—Edward L. Coles, Sr.
Attorney, Agent, or Firm—Cushman, Darby & Cushman

[57] ABSTRACT

An X-ray diagnostic apparatus comprises an X-ray tube, a fluorescent plate for converting X-rays transmitted through an object irradiated with X-rays from the X-ray tube into visible light rays, a light image intensifier for intensifying the visible light rays, an image sensor for sensing an image contained in the output light rays from the intensifier and converting it into video signals, image processing unit for image-processing the output signals from the image sensor to intensify the image and to add together the image-processed video signals of a plurality of frames, and a monitor for visualizing the output signal from the image processing unit, where the video signals after image-processing are added together to increase the amplitude of the video signal.

6 Claims, 32 Drawing Figures

X-RAY DIAGNOSTIC APPARATUS

BACKGROUND OF THE INVENTION

The present invention relates to X-ray diagnostic apparatuses.

For diagnosing hip-joint trouble often found in infants or scoliosis in youngsters, the affected parts of a human body are frequently subjected to X-rays for radiographing. These affected parts are relatively near the reproductive gland. The X-ray irradiation on the reproductive glands, therefore, is inevitable during the radiographing operation, to possibly impair its generative function. To lessen the adverse effect on the reproductive glands, it is desirable that the dosage of X-rays be as low as possible. For this reason, the X-ray apparatus has been made to emit the lowest possible dosage of radiation which can be recorded on a sensitized paper or film with a high sensitivity. An example of this type of conventional X-ray diagnostic apparatus is schematically illustrated in FIG. 1.

Figure 1:
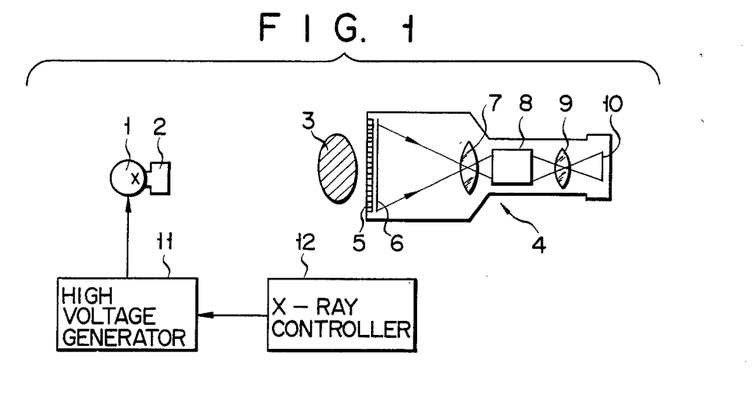
FIG. 1 shows a schematic diagram of a conventional X-ray diagnostic apparatus.

In the FIG. 1 X-ray diagnostic apparatus, X-rays are radiated from an X-ray tube 1, and are formed, by an X-ray diaphragm (collimator) 2, into an X-ray beam with a diameter sufficient to provide a desired irradiation field. An object 3 under diagnosis is irradiated with the X-ray beam. The X-ray beam transmitted through the object 3 is captured by a radiography device 4 of the low dosage type. The radiography device 4 transforms the X-ray beam into visible light rays containing image information and brings it up to a satisfactory intensity. A grid 5 for removing X-ray scattering is located on the front or X-ray incident side of the radiographic device 4. The X-rays transmitted through the grid 5 hit a fluorescent plate 6 located on the rear side of the grid 5 where the X-rays are transformed into visible light rays containing the image information. The visible rays from the fluorescent plate 6 are passed through a lens 7 and applied to a light image intensifier 8. The intensified visible rays are then projected onto a film in a camera 10, thereby forming an object image thereon. The FIG. 1 apparatus is further provided with a high voltage generator 11 for generating a high voltage for the X-ray tube 1, and an X-ray control unit 12 for controlling the tube voltage of the X-ray tube, a tube current and X-ray irradiation timing. Actually, the film for the camera 10 is a sensitized film of high sensitivity (for example, A.S.A. 3,000) to ensure the formation of an image with a low dosage of X-rays.

As described above, the conventional X-ray diagnostic apparatus is so arranged as to intensify the visible rays and apply them onto the film. Because of this arrangement, the image visualized has a low contrast and is noisy (a low S/N), providing unsatisfactory diagnosis.

Figure 2:
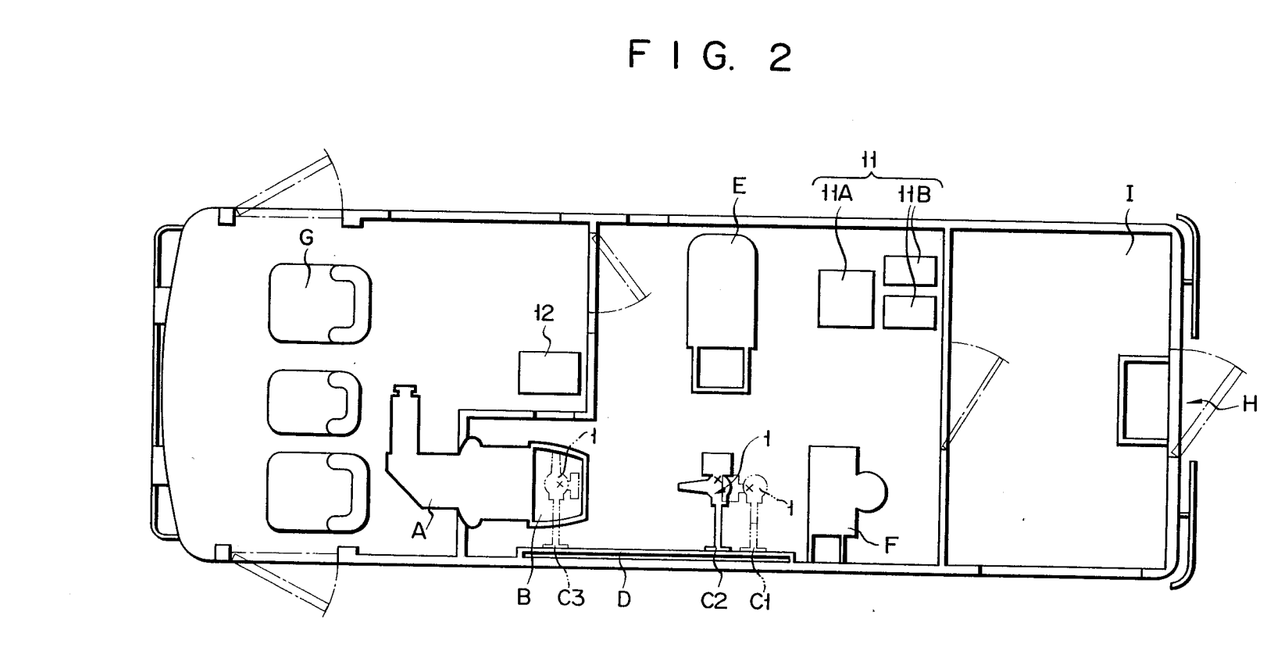
FIG. 2. schematically illustrates a layout inside an examination car carrying a conventional X-ray diagnostic apparatus.

The X-ray diagnostic apparatus as shown in FIG. 1 is carried on a mass examination car for diagnosing scoliosis, for example. A layout inside the car is as illustrated in FIG. 2. In the car, the character A designates the radiographic device. For radiographic diagnosis, the patient is laid on a table B having a foot rest in a given posture. The X-ray tube 1 mounted on an X-ray tube rail D is slid along a rail D up to a position C1, and radiates X-rays. The car further carries a mirror camera E for photographing a breast and a film changer F for direct radiographing. The X-ray tube 1 is slid along the rail D and is set at any one of positions C1 to C3 for radiographing. The tube 1 is also swingable in any horizontal direction at each position C1 to C3. In the figure, G designates driver seats, H a doorway and I a changing room for patients. Reference numeral 11 designates a high voltage generator containing a high voltage transformer 11A and a high voltage capacitor 11B, and 12 an X-ray controller. In diagnosing the patient, it is necessary to know the curvature of his vertebra precisely. To this end, in what position to pose the patient is a significant matter. When using the conventional X-ray diagnosis apparatus, before radiographing the affected part, an operator in an X-ray control room goes to a radiographing room where a patient resides and positions him in an optimum posture. Then, he comes back to his room and starts the radiographing operation. The radiographing work is very ineffective since it needs a long time for the preparation of the radiographing operation. During the radiographing operation, the operator is in the control room and cannot check whether or not the patient's posture is maintained as previously set. Therefore, the X-ray image taken in such a way using the conventional X-ray diagnostic apparatus is unreliable for providing an exact diagnosis of the disease.

SUMMARY OF THE INVENTION

Accordingly, an object of the present invention is to provide an X-ray diagnostic apparatus which can provide a clear image sufficient to provide a reliable diagnosis with low dosage X-ray irradiation.

Another object of the present invention is to provide an X-ray diagnostic apparatus which can perform a radiographing operation while checking the patient's posture.

According to the invention, there is provided an X-ray diagnostic apparatus comprising:
an X-ray tube;
means for converting X-rays transmitted through an object irradiated with X-rays from said X-ray tube into visible light rays;
means for intensifying said visible light rays;
means for sensing an image contained in the output light rays from said intensifying means and converting it into video signals;
image processing means for image-processing the output signals from said image sensing means to intensify the image and to add together the image-processed video signals of at least two fields;
display means for visualizing the output signal from said image processing means; and
a timing controller for timing the operation of said X-ray diagnostic apparatus.

According to the invention, there is further provided an X-ray diagnostic apparatus comprising:
an X-ray tube;
means for converting X-rays transmitted through an object irradiated with X-rays from said X-ray tube into visible light rays;
means for intensifying said visible light rays;
means for sensing an image contained in the ouput light rays from said intensifying means and converting it into video signals;
image processing means for image-processing the output signals from said image sensing means to intensify the image and to add together the image-processed video signals of at least two fields;
means for picking up a posture of the object to produce a video signal representing the posture;

means for composing the output signal from said image processing means and the output from said pick-up means;

display means simultaneously displays an X-ray image and a posture image on the basis of the output signal from said composing means; and a timing controller for timing the operation of said X-ray diagnostic apparatus.

DETAILED DESCRIPTION OF THE PREFERRED EMBODIMENTS

Figure 3:
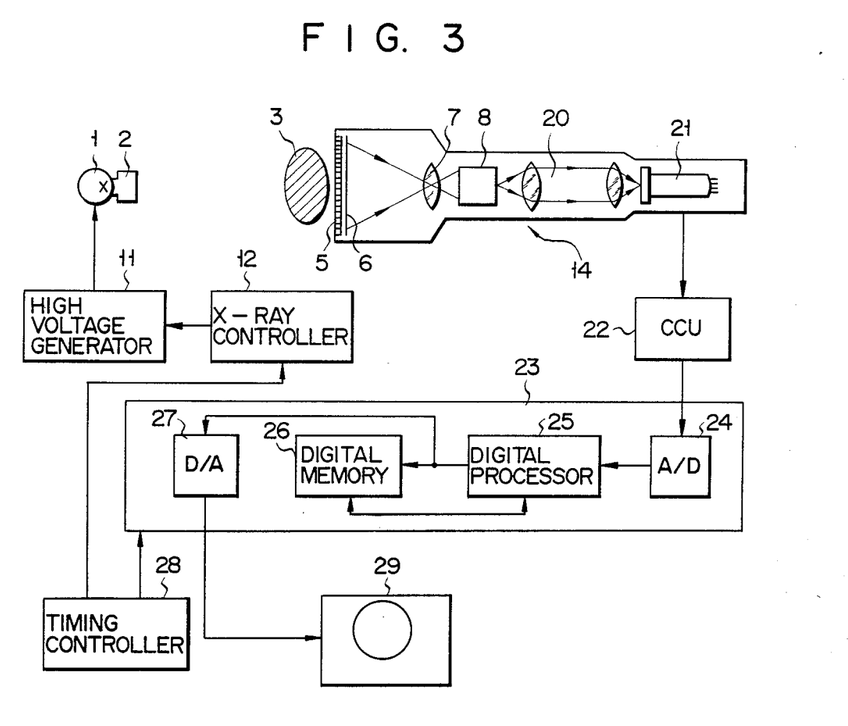
FIG. 3 is a block diagram of an embodiment of an X-ray diagnostic apparatus according to the present invention.
Figures 4A, 4B:
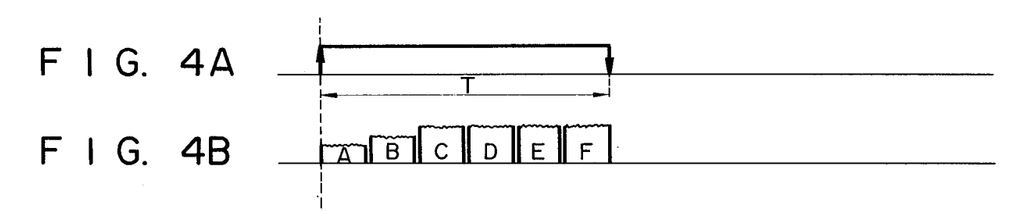
FIGS. 4A to 4C are waveforms of signals at leading portions in the X-ray diagnostic apparatus of FIG. 3.
Figure 4C:
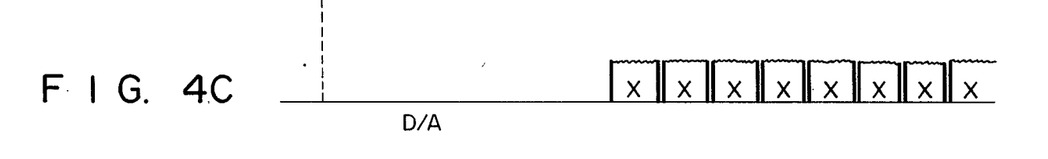

Reference is made to FIG. 3 illustrating in block form an embodiment of an X-ray diagnostic apparatus according to the present invention. Signal waveforms at leading portions in the X-ray diagnostic apparatus are illustrated in FIGS. 4A to 4C.

In the X-ray diagnostic apparatus of FIG. 3, X-rays radiated from the X-ray tube 1 are adjusted, by an X-ray diaphragm (collimator) 2, into an X-ray beam with a diameter suitable for irradiating only a desired area. The X-ray beam irradiates a predetermined field of an object 3 under diagnosis. The X-rays transmitted through the object 3 are captured by a radiography device 14 located on the rear side of the object 3. The radiography device 14 transforms the X-ray beam into visible light rays, containing image information, which are then intensified to a satisfactory intensity of light. A grid 5 for removing X-ray scattering is located on the front (or X-ray incident) side of the radiographic device 14. The X-rays transmitted through the grid 5 hit a fluorescent plate 6 disposed on the rear side of the grid 5. By the action of the fluorescent plate 6, the X-rays are transformed into visible rays of light containing the information of an object image. The visible rays from the fluorescent plate 6 are passed through a lens 7 and applied to a light image intensifier 8. The intensified visible rays are directed to an image sensor 21 such as a pick-up tube for a TV camera, through a tandem lens 20. The image sensor 21 converts the visible light image into a video signal. The image sensor 21 is further provided with a camera control unit (CCU) 22 for controlling its operation. The video signal is applied from the sensor 21 to an image processing unit 23, via the CCU 22. The image processing unit 23 properly processes the video signals from the image sensor 21. The image processing unit 23, designed using recent digital image processing technology, has various functions for the processing of video signals, such as integration, addition, average calculation, "γ" conversion, image intensification including level slice, gray level window, intermediate brightness level enhancement, configuration enhancement, etc. The image processing unit 23 is comprised of an analog to digital (A/D) converter 24 for converting an analog video signal from the image sensor 21 into a corresponding digital signal, a digital processor 25 for processing the output digital signal from the A/D converter 24, a digital memory 26 for storing data and programs, and a digital to analog (D/A) converter 27 for converting the output signal from the digital processor 25 into an analog signal.

A high voltage generator 11 generates a high voltage to energize the X-ray tube 1 to radiate X-rays therefrom. An X-ray controller 12 controls the operation of the high voltage generator 11.

A timing controller 28 controls the timings of the X-ray radiography and of the processing of the video signals by the image processing unit 23. A monitor 29 is a display device for visualizing an image as given by the video signal, delivered from the image processing unit 23.

In practice, the X-ray controller 12 operates under the control of the timing controller 28. Upon the operation of the X-ray controller 12, the high voltage generator 11 applies tube voltage and current as set by the X-ray controller 12 to the X-ray tube 1 for a given period of time. The X-ray tube 1 radiates X-rays during a given time T, as shown in FIG. 4A. The radiated X-rays are bundled, by the diaphragm 2, into an X-ray beam with a diameter wide enough to irradiate a desired field. The object 3 is then irradiated with the beam. The X-rays transmitted through the object 3 enter the low-dosage radiography device 14. The transmitted X-rays pass through the grid 5 where the scattering rays are removed. The X-rays passing through the gird 5 are applied to the fluorescent plate 6 where they are converted into visible image rays. The converted image rays are imaged on the input surface of the image intensifier 8 through the lens 7. The image intensifier 8 intensifies the image rays and applies them to the output surface. The output visible image rays are transmitted to the image sensor 21 through the tandem lens 20. The image sensor 21 picks up the image contained in the visible image rays and converts it into a video signal. Under the control of the CCU 22, the image sensor 21 outputs video signals in a time-sequential manner after the radiation of X-rays, which in turn are applied to the image processing unit 23.

In FIG. 4B, characters A to F indicate fields or frames of the video signals sequentially obtained after irradiation of the X-rays. A height of the field indicates a level of the image data. Immediately after the X-rays are radiated, the accumulation of the image data (amount of the transmitted X-rays) is small. Therefore, a level of the video signal in a first field A is small. At a time point for obtaining a second field, the accumulation of the image data further increases, and the signal level is larger than at the time point for obtaining the first field. At this time point, the video signal level does not yet enter a stationary phase of the signal level. At the time point for obtaining a third field, the accumulation time is satisfactorily long and a satisfactory amount of image data is accumulated. The signal level is larger than in the second field B. The level in the third field C is now in the stationary phase. The signal levels in the subsequent fields (i.e., 4th, 5th, 6th fields, etc.) are kept in the stationary phase. Upon termination of the X-ray radiation period, the output video signal disappears. In the course of the image intensification process, the video signals are sequentially applied to the A/D converter 24 in the image processing unit 23, then to the digital processor 25, and finally stored in the digital memory 26. The storage of the video signals in a stable state indicates the completion of the image intensifying process. The video signal processing by the image processing unit 23 includes the addition of video signals and the like, as well as the image intensifying process. The image processed data stored in the digital memory 26 are sequentially read out under control of the timing controller 28, converted into an analog signal by the D/A converter 27, and finally applied to the monitor 29 where they are displayed. The visualized data are easy to watch because they have been subjected to the image intensification process.

The picture displayed on the monitor 29 may be retained in the form of a hardcopy by printing it on a film with a multi-format camera (such as are used in CT scanners or in the nuclear medical field) or by taking it in directly off the monitor 29 with a camera.

The addition of the video signals which is performed in the image processing unit 23, or the digital processor 25 and the digital memory 26, is for obtaining a clear picture under irradiation by the low-dosage X-rays being used. More particularly, this is done for obtaining a clearer image based on the video signal with a level below the standard level of 0.1 Vp-p (video signal 0.7 V and synchronizing level 0.3 V). The addition processing will be shown using an example where 20 fields of video signals at 1/20 the level of a standard signal are added together.

Figure 5:
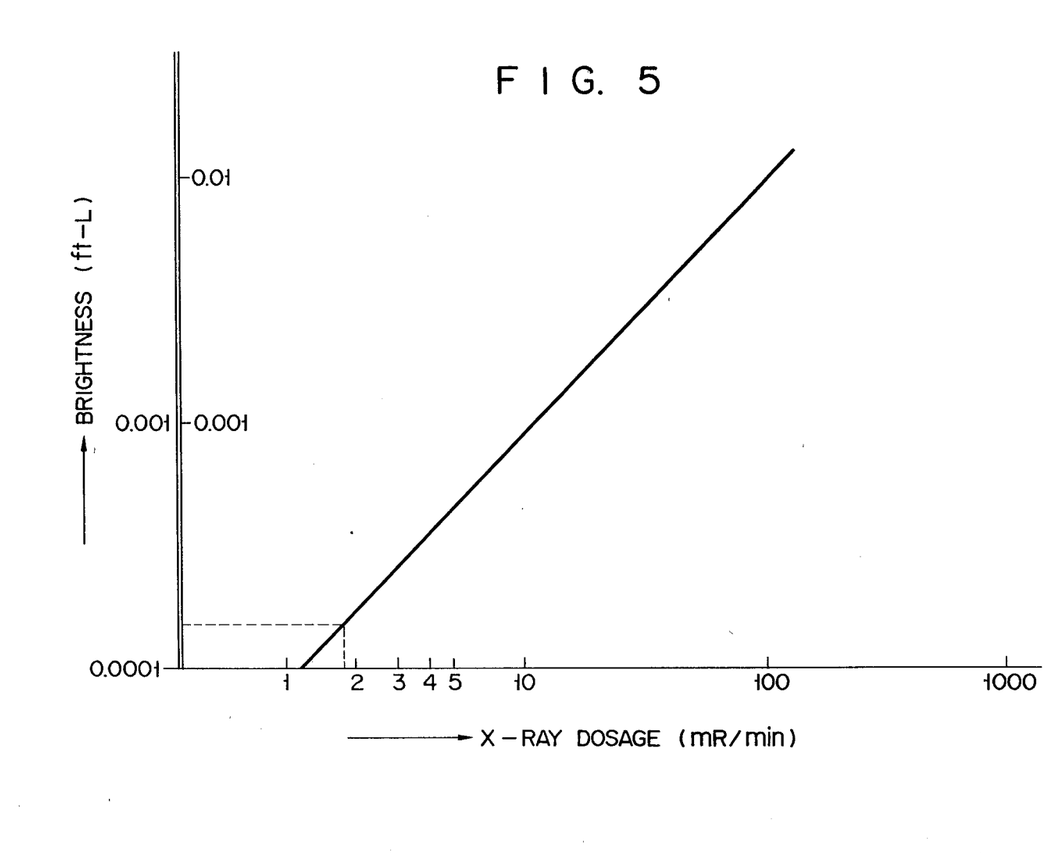
FIG. 5 shows a relationship of brightness to X-ray dosage of a fluorescent plate used in the FIG. 3 apparatus.
Figure 6:
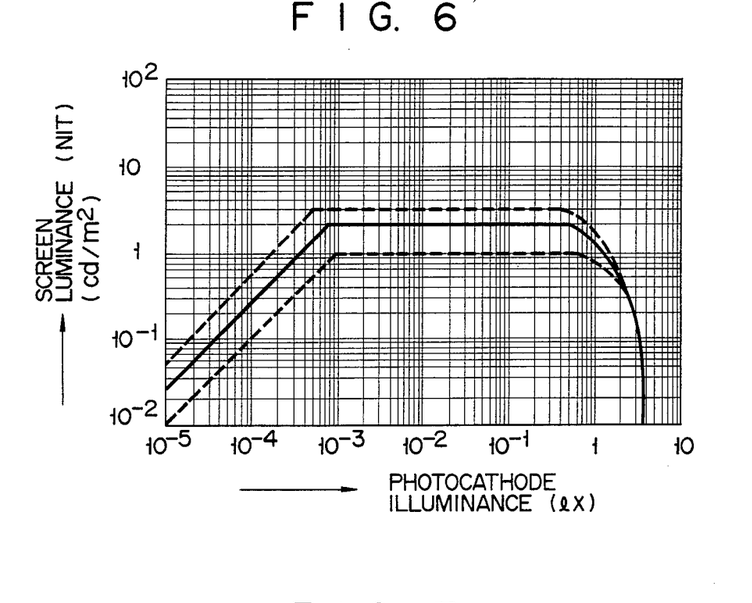
FIG. 6 shows a graph illustrating the relationship of screen luminance to photocathode luminance of a light image intensifier used in the apparatus of FIG. 3.

The disease of a patient under diagnosis is assumed to be scoliosis. For this diagnosis, a rare earth fluorescent plate such as the plate 6 has a dimension of 500 mm in length × 400 mm in width, and a brightness vs. X-ray dosage characteristic as shown in FIG. 5. The lens 7 is specified by $f_1$ (focal distance) = 40 mm and $F_1$ (F-number) = 0.75. The image intensifier 8, which is quite small, has a high secondary electron multiplying function, and is designed on the basis of a micro channel plate (MCP), for example, to remarkably intensify week incident light. The size of the image intensifier 8 is 20 mm$\phi$ for the input face and 30 mm$\phi$ for the output face. The luminance characteristic of the same is as shown in FIG. 6. The tandem lens system is composed of an input lens 20a closer to the image intensifier 8 and an output lens 20b closer to the image sensor 21. The input lens 20a is specified by $f_2 = 95$ mm and $F_2 = 0.95$, and the output lens 20b by $f_3 = 33$ mm and $F_3 = 0.75$. An image is formed, with a diameter of approximately 10 mm$\phi$ on the imaging surface of the image sensor 21. Output luminance of the image intensifier 8 is $B_2(Cd/M^2)$.

Under the above conditions, a degree of luminous flux divergence of the image intensifier 8, as designated by $R_2$, is given $$R_2 = \pi B_2 [\text{lumen}/m^2] \tag{1}$$

A total magnification $m_2$ in the lens system 20 is: $m_2 = 33/95$. The effective brightness $F_2'$ is:

$$F_2' = \frac{95}{\left(\frac{33}{0.75}\right)} = 2.159.$$

Figure 8:
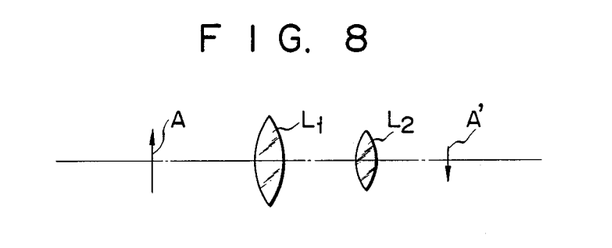
FIG. 8 schematically illustrates principles of a combination of two lens.

The illuminance E of an image A' in a tandem lens system composed of lenses $L_1$ and $L_2$ as shown in FIG. 8 is expressed $$E = \frac{RT}{(4F^2 + 1)m^2} \tag{2}$$

where T and m are transmissivity and magnification of the lens system, respectively. Further, $m = (f_2/f_1)$, and F is an effective brightness, and R is a degree of luminous flux divergence of an object under radiographing A. $f_1$ and $f_2$ are the focuses of the lenses $L_1$ and $L_2$, respectively.

Rearranging the equations (1) and (2) with an assumption of $T_2 = 0.8$, we have the illuminance $E_2$ on the imaging surface of the image sensor 21 as given by $$E_2 = \frac{R_2 T_2}{\{4(F_2')^2 + 1\}(m_2)^2} \tag{3}$$

$$= \frac{\pi B_2 \times 0.8}{\{4(2.159)^2 + 1\} \times \left(\frac{33}{95}\right)^2}$$

$$= 1.06 B_2 \text{ [lux]}$$

Let us consider an amount of light rays incident on the image sensor 21. In the case of a 1-inch vidicon, for example, an illuminance of the incident light rays required for a standard output current 0.2 $\mu$A is 120 lux as taught by the general photo-electric converting characteristic.

An output characteristic of the light image intensifier 8 generally has a P-20 characteristic with a peak of the wave length in the vicinity of 550 nm. Its spectrum sensitivity characteristic closely resembles that of the vidicon. The spectrum sensitivity characteristics of the vidicon and chalnicon are related by a ratio of about 3:1.

The 1-inch chalnicon has a sensitivity about three times that of the vidicon of the same size. When the 1-inch chalnicon is used for the image sensor 21, the illuminance of the incident light necessary for obtaining a 0.2 $\mu$A output current is $$(120/3) = 40 \text{ (lux)} \tag{4}$$

The assumption is made that a standard video output Vs of an image pick-up system including the image sensor 21 and the CCU 22 is 1.0 Vp-p (video output 0.7 V), and its synchronizing output is 0.3 V, when the output current is 0.2 μA.

In the case where the video signals of 20 fields are added together, the incident light luminance required for the light incident surface of the image sensor 21 can be obtained by dividing 40 lux of the equation (4) by the number of fields 20:

$$40/20 = 2 \text{ (lux)} \quad (5)$$

A radiation time required for adding 20 fields of video signals, when an X-ray radiation time of one field is 16.7 msec, is $$16.7 \text{ msec} \times 20 = 334 \text{ (ms)}$$

From the equations (3) and (5), we have $$1.06 B_2 = 2 \quad (6)$$
$$B_2 = 1.887 \ (Cd/m^2)$$

In the case where the image intensifier 8 has a general luminance vs. illuminance characteristic as indicated by a solid line in FIG. 6, the incident X-ray illuminance, when $B_2$ (a degree of luminous flux divergence) = 1.887 $(Cd/m^2)$, is $$0.6 \text{ (mlux)} \quad (7)$$

Let us consider input light rays to the light image intensifier 8.

Figure 7:
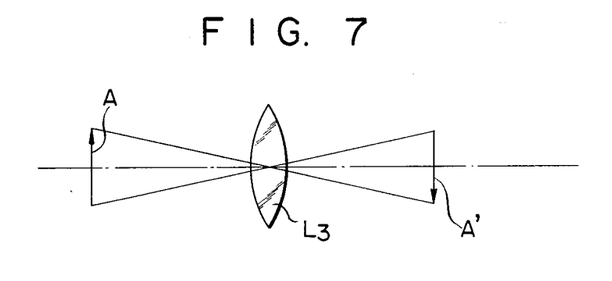
FIG. 7 schematically illustrates principles of a single convex lens.

The principle of the lens 7 for leading the output light rays from the fluorescent plate 6 is as illustrated in FIG. 7. An illuminance of the image A' in FIG. 7 is $$E = \frac{RT}{4F^2(m+1)^2} \quad (8)$$

were R is a degree of luminous flux divergence of the object A, L the transmissivity of the lens L3, and F the brightness of the lens L3.

Assuming that $B_1(Cd/m^2)$ is the output luminance of the fluorescent plate 6, $R_1$ a degree of luminous flux divergence, $E_1$ an incident light illuminance to the intensifier 8, $T_1$ a lens transmissivity from the equation (8) we have $$E_1 = \frac{R_1 \times T_1}{4 F_1^2 (m_1 + 1)^2}$$

$R_1 = B_1 (lumen/m^2)$. If $T_1 = 0.8$, $F_1 = 0.75$ and $m_1 = 20/500$, $$E_1 = \frac{\pi B_1 \times 0.8}{4 \times 0.75^2 \left(\frac{20}{500} + 1\right)^2} \quad (9)$$

$$= 1.033 B_1 \text{ [lux]}$$
$$= 1033 \ B_1 \text{ [mlux]}.$$

From the equations (7) and (9), the following is derived:

$$1033 B_1 = 0.6 \quad (10)$$
Therefore, $B_1 = 0.00058 \ [Cd/m^2]$
$= 0.00058 \times 0.292 \text{ [ft-L]}$
$= 0.000169 \text{ [ft-L]}$ An incident X-ray dosage required for obtaining the luminance of $B_1 = 0.000169$ (ft-L) is 1.8 mR/min, from the FIG. 5 characteristic. The X-ray dosage for radiography (radiographic dosage) is $$1.8 \ (mR)/60 \times 0.334 = 0.01002 \ (mR)$$
$$= 10.02 \ (\mu R).$$

As seen from the above calculation, in the X-ray diagnostic apparatus using a combination of a direct radiographic system and a standard film, the incident X-ray dosage required is assumed to be approximately 1,000 (μR/frame).

To accomplish this, only 10 (μR/frame) is needed if the addition of the video signals is performed. This indicates that the required X-ray dosage can be reduced by 99%.

Another embodiment of an X-ray diagnostic apparatus according to the present invention will now be described referring to FIG. 9. As previously stated, the FIG. 3 embodiment compensates for the insufficient level of the video signal by adding the video signals. The FIG. 9 embodiment is so arranged that during X-ray irradiation, the image sensor 21 is blanked to stop pick-up of the video signals, and after termination of the X-ray irradiation, the video signal pick-up starts. The present embodiment thus arranged provides a clearer picture on the monitor. The circuit arrangement of the present embodiment is the same as that of the FIG. 3 embodiment, except that a control line connects the timing controller 28 to the image sensor 21.

Figure 10A:
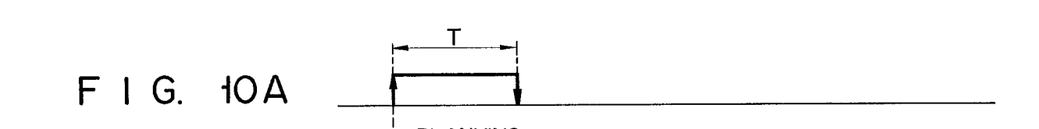
FIGS. 10A to 10D are waveforms of signals at leading portions in the X-ray diagnostic apparatus of FIG. 9.
Figure 10B:
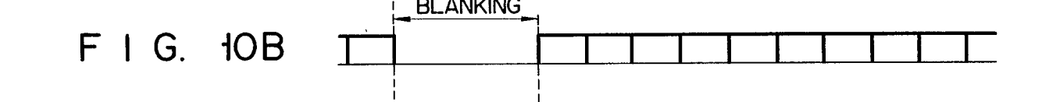
Figure 10C:
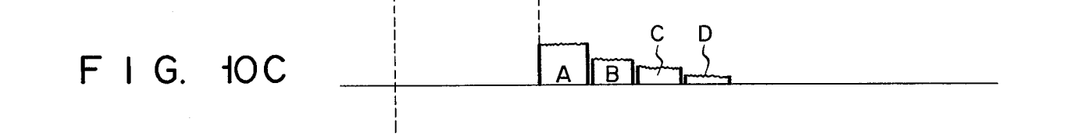

In the present embodiment, the timing controller 28 controls the timings of radiation of the X-rays and blanking of the image sensor 21. As seen from FIGS. 10A and 10B, during at least the period T (FIG. 10A) of X-ray radiation, the timing controller 28 blanks the image sensor 21 to stop the pick-up of the video signal (FIG. 10B). During this period, the image data is stored. At the termination of X-ray irradiation, the timing controller 28 releases the image sensor 21 from its blanked state. The image sensor 21 picks up the stored image data in the form of video signals in synchronism with a scanning speed of the CCU 22.

Figure 10D:
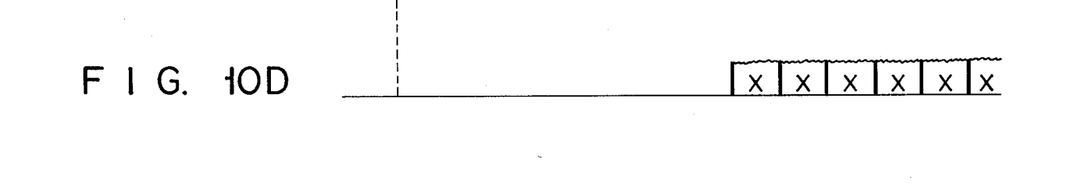

When the image sensor 21 is an image pick-up tube, the video signals are picked up in such a manner that an object is imaged on the input target surface to form an electrical latent image thereon, and the latent image is scanned by an electron beam. Of these video signals thus obtained, a level of the video signal in the first field A is highest and the video signal levels in the succeeding fields B, C, D, ... are reduced stepwise in this order. In the first field A, a large amount of stored charge is left and the video signal level is high. With the increasing of reading out of the stored charge, the residual charge decreases. And the video signal level becomes low gradually in the succeeding fields B, C, D, .... The video signals are subjected to image processing in the image processing unit 23 and then stored in the digital memory 26. The stored image data is sequentially read out and converted into an analog signal by the D/A converter 27. The analog signal is then applied to the monitor 29 where it is displayed. FIG. 10D shows the data after the D/A conversion.

As described above, the FIG. 9 embodiment blanks the image sensor 21 to stop its image pick-up operation during the period of X-ray radiation. After the X-ray radiation terminates, it releases the image sensor 21 from its blanked state to allow its image pick-up operation to start. With this arrangement, a sufficient amount of signal charge can be stored even at a low incident light illuminance, to provide video signals at sufficient levels. The present embodiment may read out the video signals more efficiently than the FIG. 3 embodiment. This indicates the radiographing time is shorter and the X-ray dosage required for satisfactory radiographing is lower.

Figure 9:
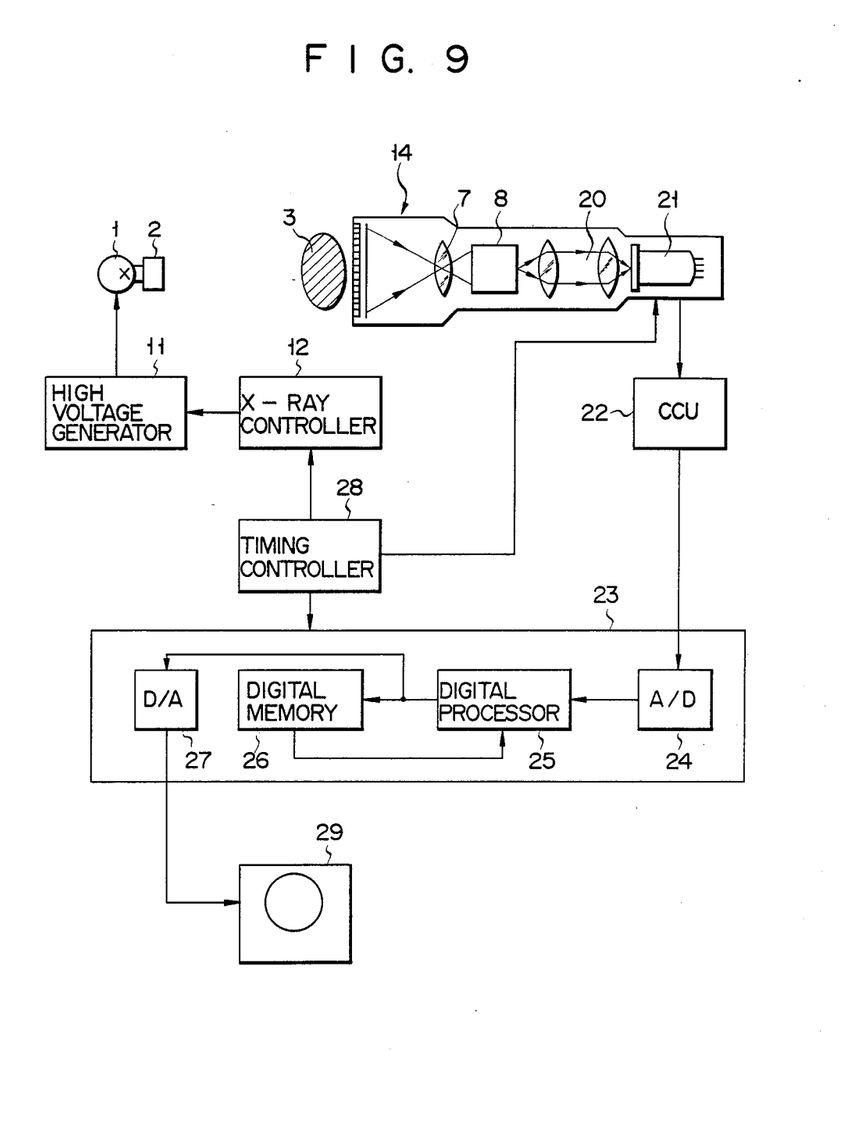
FIG. 9 is a block diagram of another embodiment of an X-ray diagnostic apparatus according to the present invention.

In the X-ray diagnostic apparatus shown in FIG. 3 or 9, X-rays are converted into visible light rays containing image information by the fluorescent plate 6. The visible image is then intensified by the image intensifier 8. The image sensor 21 picks up the image from the visible rays. The apparatus is further provided with means for intensifying the video signals representing the image by image processing the video signals. The video signals thus processed are displayed. Therefore, a displayed picture is clear enough to allow a satisfactory diagnosis. The video signals thus processed in the fields are added together. Further, the image pick-up operation is performed after a sufficient amount of the signal charge is stored. Therefore, the video signals obtained have high levels even if the low dosage of the X-rays is radiated for a short period. This enables the X-ray diagnostic apparatus to be operable with lower dosage of X-rays.

Figure 11A:
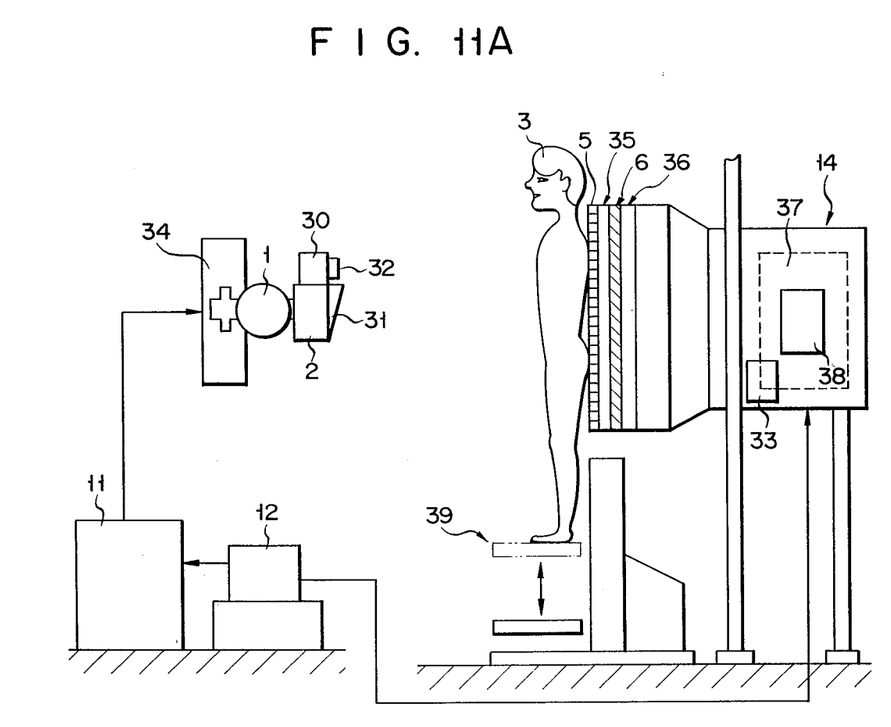
FIGS. 11A and 11B schematically illustrate another embodiment of an X-ray diagnostic apparatus with a television camera for observing the patient's posture according to the present invention.
Figure 11B:
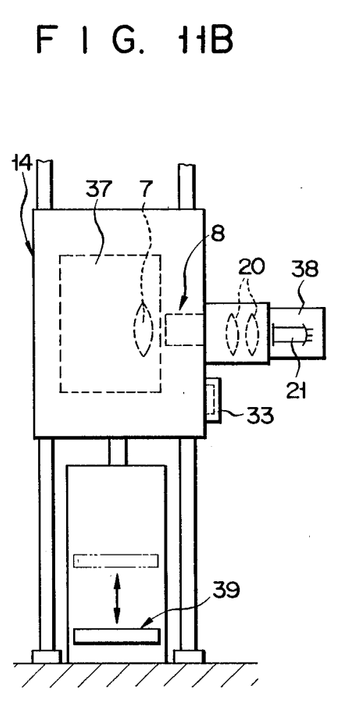

FIGS. 11A and 11B illustrate another embodiment of an X-ray diagnostic apparatus according to the present invention. FIG. 11A is a side view of the X-ray diagnostic apparatus when a patient, as an object under diagnosis, is set in the apparatus for diagnosis. FIG. 11B is a front view of the X-ray diagnostic apparatus.

As shown in the figures, the X-ray diagnostic apparatus is provided with a second TV camera 30 for monitoring the posture of the patient 3, in addition to the radiography device 14 which has a first TV camera. The posture of the patient, together with the affected part of the patient's body is displayed on the mirror screen. A wedge filter 31 of aluminum, for example, for adusting a distribution of X-ray intensity is mounted at the output side of the diaphragm 2. In the drawings, reference numeral 32 designates a lens for the second camera 30, and 33 a CRT contained in the radiography device 14. Numeral 34 represents a support for the X-ray tube 1 which is slidably mounted on the slide rail D shown in FIG. 2, for example. Provided in front of the fluorescent plate 6 is an X-ray gird chart 35 for providing criteria in judging the curvature of the vertebrae. A lead glass plate 36 is located at the rear side of the fluorescent plate 6. A reflecting mirror 37 for deflecting the incident light rays from the fluorescent plate 6 is provided in the radiography device 14. Reference numeral 38 designates a television camera section and 39 a table on which a patient is placed. The table 39 is slidable up and down. Like numerals are used for designating like portions in FIGS. 3 and 9.

Figure 12:
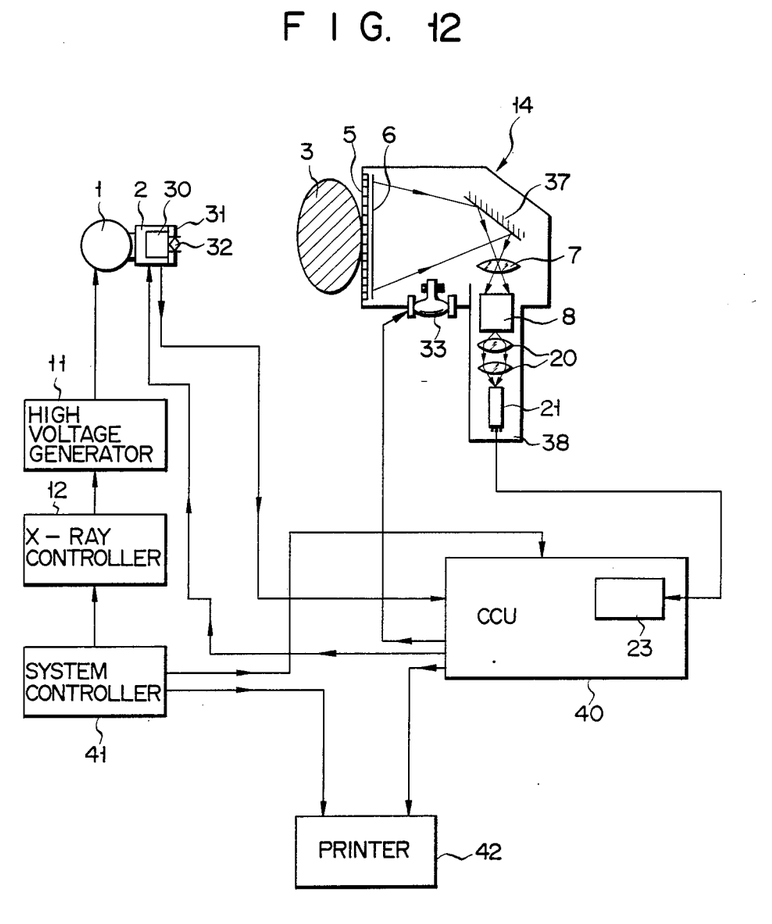
FIG. 12 is a block diagram of a system controller used in the X-ray diagnostic apparatus of FIGS. 11A and 11B.

FIG. 12 shows the arrangement of a control system used in the embodiment shown in FIGS. 11A and 11B.

A camera control unit (CCU) 40, provided with the image processing unit 23, is applied with video signals of the affected part from the image sensor 21 and video signals representing the patient's posture from the second camera 30. The system controller 41, composed of a crystal oscillator, a frequency divider, etc., supplies timing control signals to an X-ray controller 12, the CCU 40 and the printer 42. The CCU 40 supplies control signals to a CRT 33 and a second television camera 30 for posture monitoring. The video signal images processed by the CCU 40 are sent to the printer 42.

Figure 13:
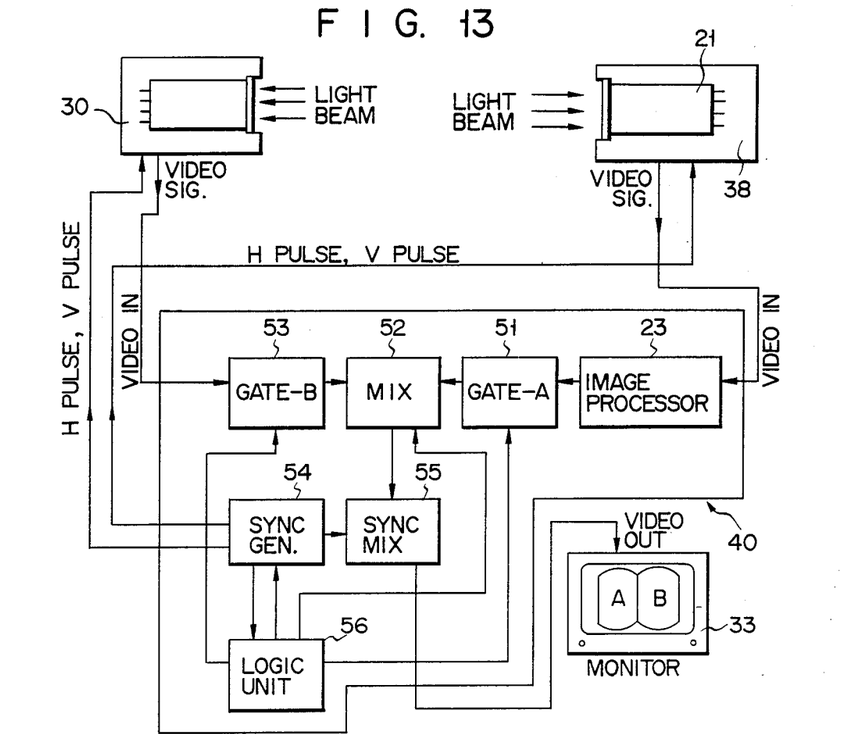
FIG. 13 is a block diagram of a monitor used in the X-ray diagnostic apparatus of FIGS. 11A and 11B.

An arrangement of the CCU 40 and its operation will be described referring to FIGS. 13, and 14A to 14L. As shown in FIG. 13, the CCU 40 is comprised of an image processing unit 23 for receiving the output video signal from the image sensor 21, a GATE-A 51 for gating the output signal from the image processing unit 23, a GATE-B 53 for gating the output signal from the second television camera 30, and a mixer 52 for mixing the output signals from the GATE-A 51 and a GATE-B 53. The CCU 40 further includes a mixer 55 for mixing a synchronizing pulse from a synchronizing generator 54 and the output signal from the mixer 52, a monitor 33 for displaying a picture as given by the output signal from the mixer 55, and a logic unit for receiving the synchronizing pulse from the generator 54 and for transferring a timing control signal to the gates 51 and 53, the mixer 52 and the generator 54. The output pulses from the synchronizing pulse generator 54 are applied as a horizontal synchronizing pulse (H pulse) and a vertical synchronizing pulse (V pulse) to the television camera. The video signal from the mixer 55 is applied to the monitor 33.

Figure 14A:
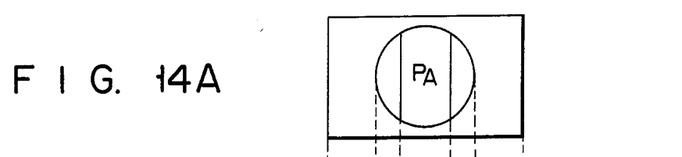
FIGS. 14A to 14L are waveforms of signals at various portions in the apparatus of FIG. 13.
Figure 14B:
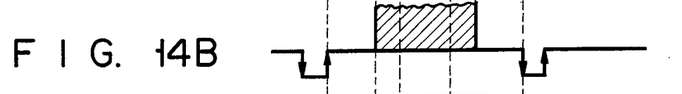
Figure 14C:
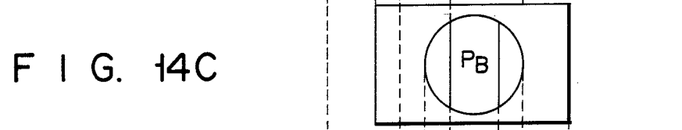
Figure 14D:
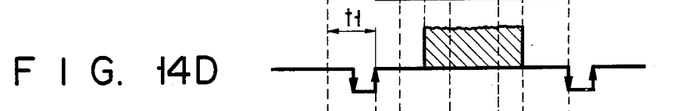
Figure 14E:
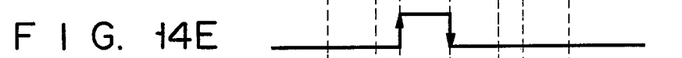
Figures 14F, 14G:
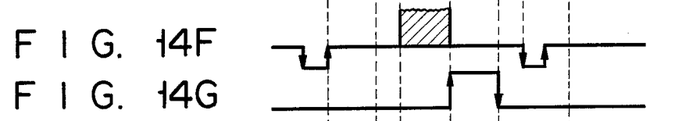
Figures 14H, 14I:
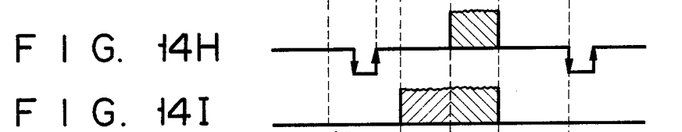
Figure 14J:
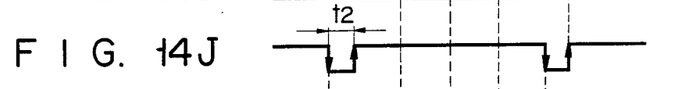
Figure 14K:
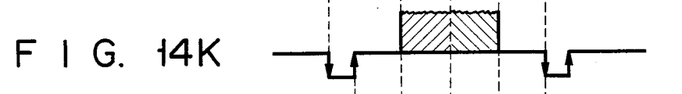
Figure 14L:
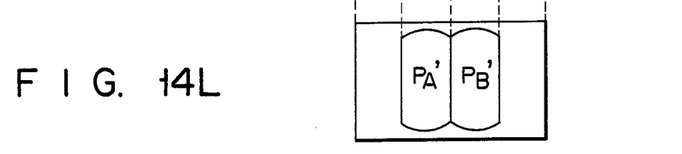

In operation, the video signals of one field (FIG. 14B) are obtained from an image of the affected part PA (FIG. 14A) picked up by the image sensor 21 of the radiography device 38. Then, the video signals are delayed for a given time t1 by the logic unit 56. And the video signals of one field (FIG. 14D) are obtained from a posture image PB (FIG. 14C) as given by the second television camera 30. The middle parts (FIGS. 14F and 14H) of the video signals, each of one field (FIGS. 14B and 14D), are respectively extracted from these video signals by means of the gates 51 and 53. These gates receive as their gate input control signals PG-A (FIG. 14E) and PG-B (FIG. 14G) with different timings from the logic unit 56. The display video signals extracted are mixed by the mixer 52 (FIG. 14I). The mixed video signal is mixed with the synchronizing signal (FIG. 14J) delayed by a time t2 from the synchronizing signal for obtaining the image PA, in the mixer 55. The mixer 55 produces the signal thus mixed as a composite signal PA-PB (FIG. 14K). The composite signal is input to the TV monitor 33 which in turn displays pictures PA' and PB' as given by the composite signal on its screen. In this way, two different pictures PA' and PB' are simultaneously displayed on the TV monitor 33.

An overall operation of the present embodiment will now be described.

An operator tells the patient 3 to get on the foot table 39. Then, he vertically adjusts the foot table by means of an adjusting means (not shown) to position an affected part of the patient on the center line of a group of X-rays. At this time, he also sets the position and posture of the patient in an optimum state for diagnosis. Following this preparatory work for diagnosis, the operator enters the X-ray control room and watches a posture image of the patient on the monitor screen. As described above, the posture image is given by the second TV camera and the monitor is contained in the radiography device 14. If the patient's posture is not proper, he tells the patient to resume the optimum posture, all the time watching the posture image. After ascertaining that the patient is posed optimally, he starts to radiograph the affected part. The radiographing operation can be performed in a desired processing mode if the format and level of the image processing unit 23 have been properly set by the system controller 41. Upon depression of the start button (not shown), a given tube voltage and current are applied from the high voltage generator 11 to the X-ray tube 1 under control of the X-ray controller 12. Then, the X-rays are radiated toward the patient 3. With the irradiation of the X-rays, the monitor displays an image of the affected part of the patient on its screen. At this time, the X-ray image PA from the first TV camera 38 and the posture image PB from the second TV camera are simultaneously displayed side by side, as mentioned above. The X-ray image PA is clear and easy to watch, even though low dosage X-rays are used, because the video signals giving the image are uniquely processed by the image processing unit 23. The X-ray image may also be preserved in hardcopy by using the printer.

The radiograph taken by the X-ray diagnostic apparatus, therefore, is reliable for the diagnosis. The simultaneous display of both the X-ray image and the posture image, if kept in the form of a hardcopy, makes the diagnosis even more reliable, since a doctor may later observe these images and compare them. This is effective particularly for the diagnosis of the scoliosis, because the disease generally needs many years of treatment.

Figure 15:
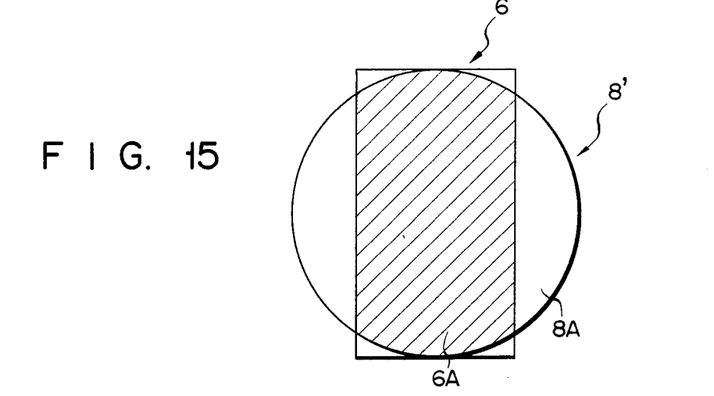
FIG. 15 illustrates overlapping states of the fluorescent plate with an image area on a target surface of an image sensor.

Only the signal components at the mid-portions of the video signals (FIGS. 14C and 14A) as picked up by the two television cameras, are extracted and used for the image formation on the monitor screen. Accordingly, there may be some concern about degradation of the quality of the pictures formed. The X-ray diagnosis apparatus using the fluorescent plate 6 according to the invention, however, is free from such problems. The reason for this will be given referring to FIG. 15. FIG. 15 illustrates a relationship between an image area projected on the target face of the image sensor in the first TV camera 38 (corresponding to an effective image area of the image intensifier 8 and an effective image area on the fluorescent plate 6). The video signals present in a superposed area 6A as shaded are essential signal components but the signals in the remaining area are not essential for the picture formation. The width of the essential area 6A is determined by the fluorescent plate 6. The plate 6 is rectangular shaped for radiographing the vertibrae of a human body. The plate 6 for youngsters has a dimension of 500 mm in length × 400 mm in width at the input face. The diameter of the image area 8' on the target face of the image sensor 21 is generally larger than the width of the fluorescent plate 6. Therefore, the side areas of the image area 8' are not superposed with the plate 6. In radiographing the vertibrae, both sides of the vertibrae are frequently off the radiographing target, for preventing irradiation on the reproductive glands. For this reason, both side areas 8A of the area 8' on the target face are unnecessary. The removal of the video signals corresponding to these areas 8A, therefore, does not affect the picture quality.

As seen from the foregoing, the X-ray diagnostic apparatus according to the present invention employs a unique image intensifying means prior to the monitor stage. This feature ensures a much clearer image for low dosage X-ray irradiation. With the aid of the TV camera to pick up the patient's posture, an operator can radiograph the affected part of a human body exactly. This can further improve the diagnosis by a doctor.

What is claimed is:

1. An X-ray diagnostic apparatus for diagnosing a curvature of vertebrae comprising:
   an X-ray tube;
   means for converting X-rays transmitted through an object irradiated with X-rays from said X-ray tube into visible light rays;
   means for intensifying the visible light rays;
   means for sensing an image contained in the output light rays from said intensifying means and converting it into first video signals;
   image processing means for image processing the output signals from said image sensing means to intensify the image;
   means for picking up a posture of the object to produce second video signals representing the posture;
   means for composing the output signals from said image processing means and the output signal from said picking up means, the composing means including means for extracting the components of the images corresponding to the video signals produced from said image processing means and picking up means which fall on said images, within a predetermined range in a predetermined direction, and mixing means for differentiating the timings of the extracted component video signals one from another and for mixing them;
   display means for simultaneously displaying the X-ray image and the posture image on the screen side by side in a horizontal direction on the basis of the output signals from said composing means; and
   a timing controller for timing the operation of the whole system.

2. An X-ray diagnostic apparatus according to claim 1, wherein said timing controller stops the pick-up of the first video signals and stores an input image during the radiation of said X-ray tube.

3. An X-ray diagnostic apparatus according to claim 1, wherein said image processing means includes an analog to digital converter for converting the output video signals from said image sensing means into a digital signal, a digital processor for image-processing the digital video signals from said converter to intensify the picture and for adding together the image-processed video signals of at least two fields, a digital memory for storing the video signals from said digital processor, and a digital to analog converter for converting the video signals from said digital processor into an analog signal.

4. An X-ray diagnostic apparatus according to claim 1, wherein said extracting means includes a first gate means for gating the video signals from said image-processing means, second gate means for gating the video signals from said picking up means, a first mixer for mixing the output signals from said first gate means and said second gate means, a logic unit for controlling said first and second gate means, a system synchronizing pulse generating circuit and a second mixer for mixing the output pulse from said pulse generating circuit with the output signal from said first mixer and for outputting the mixed signal to said display means.

5. An X-ray diagnostic apparatus according to claim 1, wherein said picking up means includes a television camera.

6. An X-ray diagnostic apparatus according to claim 1, wherein said means for intensifying the visible light rays comprises a fluorescent plate.

* * * * *